United States Patent
Ramacher et al.

(10) Patent No.: US 7,376,682 B2
(45) Date of Patent: May 20, 2008

(54) TIME MODEL

(75) Inventors: Mark Ramacher, San Carlos, CA (US); Graham S. Wood, El Granada, CA (US); Juan Loaiza, Redwood City, CA (US); Tirthankar Lahiri, Santa Clara, CA (US); Karl Dias, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 629 days.

(21) Appl. No.: 10/775,513

(22) Filed: Feb. 9, 2004

(65) Prior Publication Data

US 2005/0055672 A1 Mar. 10, 2005

Related U.S. Application Data

(60) Provisional application No. 60/500,864, filed on Sep. 5, 2003.

(51) Int. Cl.
*G06F 17/30* (2006.01)
(52) U.S. Cl. .................................. 707/206
(58) Field of Classification Search ............ 707/206, 707/100
See application file for complete search history.

(56) References Cited

U.S. PATENT DOCUMENTS

| | | | |
|---|---|---|---|
| 2,883,255 A | 4/1959 | Anderson |
| 3,324,458 A | 6/1967 | Macarthur |
| 3,344,408 A | 9/1967 | Singer et al. |
| 3,351,910 A | 11/1967 | Miller et al. |
| 4,654,806 A | 3/1987 | Poyser et al. |
| 4,994,986 A | 2/1991 | Cihiwsky et al. |
| 5,349,662 A | 9/1994 | Johnson et al. |
| 5,488,648 A | 1/1996 | Womble |
| 5,729,736 A | 3/1998 | Gomi et al. |
| 5,781,703 A | 7/1998 | Desai et al. |

(Continued)

FOREIGN PATENT DOCUMENTS

JP 55-91036 A 7/1980

(Continued)

OTHER PUBLICATIONS

Doppelhammer et al., "Database Performance in the Real World: TPC-D and SAP R/3," 1997, ACM, p. 123-124.

(Continued)

*Primary Examiner*—Cheryl Lewis
(74) *Attorney, Agent, or Firm*—Townsend and Townsend and Crew LLP

(57) ABSTRACT

Quantifying the impact of wasteful operations on a database system is provided. One or more operations that are determined to be wasteful are received. The impact of the wasteful operations on performance in a database may then be quantified. The database is monitored to determine when a wasteful operation is being performed. When a wasteful operation is detected, a time value is recorded of the time spent on processing the wasteful operation. The time value is stored and used to quantify an impact of a performance problem in a database. The time value may be stored and associated with other time values that are recorded for the same wasteful operation. Thus, the impact of wasteful operations that are performed and processed in a database may be determined.

18 Claims, 11 Drawing Sheets

U.S. PATENT DOCUMENTS

| | | |
|---|---|---|
| 5,872,976 A | 2/1999 | Yee et al. |
| 6,035,306 A | 3/2000 | Lowenthal et al. |
| 6,311,175 B1 | 10/2001 | Adriaans et al. |
| 6,615,222 B2 | 9/2003 | Hornibrook |
| 6,804,627 B1 | 10/2004 | Marokhovsky et al. |
| 6,954,717 B2 | 10/2005 | Boldt et al. |
| 6,955,302 B2 | 10/2005 | Erdman, Jr. |
| 7,085,786 B2 | 8/2006 | Carlson et al. |
| 7,089,347 B2 | 8/2006 | Mogi et al. |
| 2002/0065833 A1 | 5/2002 | Litvin |
| 2004/0044500 A1 | 3/2004 | Lu |
| 2004/0044700 A1* | 3/2004 | Fisher et al. ............... 707/202 |
| 2005/0103874 A1 | 5/2005 | Erdman, Jr. |
| 2005/0278381 A1 | 12/2005 | Diao et al. |
| 2007/0022192 A1 | 1/2007 | Nguyen et al. |

FOREIGN PATENT DOCUMENTS

| | | |
|---|---|---|
| JP | 02-232795 A | 9/1990 |
| WO | WO 02/06949 A2 | 1/2002 |
| WO | WO 02/137061 A1 | 5/2002 |

OTHER PUBLICATIONS

Hagmann et al., "Performance Analysis of Several Back-End Database Architectures," 1986, ACM, p. 1-26.

IBM Technical Disclosure Bulletin, "Software Monitor for Performance Tuning a Virtual Memory Computer System", May 1, 1973, vol. No. 15, Issue No. 12, pp. 3730-3733.

RYU et al., "Analysis of Database Performance with Dynamic Locking," 1990, ACM, p. 491-523.

Stonebraker et al., "Performance Enhancements to a Relational Database System," 1983, ACM, p. 167-185.

* cited by examiner

Example 2: ADDM report

```
DBMS_ADVISOR.GET_TASK_REPORT('BB')
--------------------------------------------------------------------------------
         DETAILED ADDM REPORT FOR TASK 'bb' WITH ID 16
         ---------------------------------------------

Analysis Period: 30-MAY-2003 from 10:27:57 to 10:31:03
        Database ID/Instance: 1/1
             Snapshot Range: from 9 to 10
              Database Time: 1582 seconds
       Average Database Load: 8.5 active sessions ~~~~~~~~~~~~~~~~~~~~~~~~~~~~~~~~~~~~~~~~~~~~~~~~~~~~~~~~~~~~~~~~~~~~~~~~~~~~~~~~
FINDING 1: 13% impact (201 seconds)
-----------------------------------
A hot data block with concurrent read and write activity was found. The block
belongs to segment "RWBOLTON.TAB_BBW_DATABLOCK_I" and is block 70 in file 3.

RECOMMENDATION 1: Application Analysis, 13% benefit (201 seconds)
     ACTION: Investigate application logic to find the cause of high
          concurrent read and write activity to the data present in this block.
          RELEVANT OBJECT: database block with object# 40984, file# 3 and
          block# 70
     RATIONALE: The SQL statement with SQL_ID "4vxy8fv4y3dhd" spent
          significant time on "buffer busy waits" for the hot block.
          RELEVANT OBJECT: SQL statement with SQL_ID 4vxy8fv4y3dhd
          UPDATE TAB_BBW_DATABLOCK SET REC_ID = :B3+:B2+1 WHERE REC_ID = :B1
     RATIONALE: The SQL statement with SQL_ID "90n4zy8h6375p" spent
          significant time on "buffer busy waits" for the hot block.
          RELEVANT OBJECT: SQL statement with SQL_ID 90n4zy8h6375p
          UPDATE TAB_BBW_DATABLOCK SET REC_ID = :B3 WHERE REC_ID = :B2+:B1+1

SYMPTOMS THAT LED TO THE FINDING:
        Wait class "Concurrency" was consuming significant database time. (24%
        impact [375 seconds])

FINDING 2: 13% impact (201 seconds)
-----------------------------------
Read and write contention on database blocks was consuming significant
database time.

RECOMMENDATION 1: Schema, 13% benefit (201 seconds)
     ACTION: Consider hash partitioning the INDEX
        "RWBOLTON.TAB_BBW_DATABLOCK_I" with object id 40984 in a manner that
        will evenly distribute concurrent DML across multiple partitions.
        RELEVANT OBJECT: database object with id 40984
     RATIONALE: The UPDATE statement with SQL_ID "4vxy8fv4y3dhd" was
        significantly affected by "buffer busy waits".
        RELEVANT OBJECT: SQL statement with SQL_ID 4vxy8fv4y3dhd
        UPDATE TAB_BBW_DATABLOCK SET REC_ID = :B3+:B2+1 WHERE REC_ID = :B1
     RATIONALE: The UPDATE statement with SQL_ID "90n4zy8h6375p" was
        significantly affected by "buffer busy waits".
        RELEVANT OBJECT: SQL statement with SQL_ID 90n4zy8h6375p
        UPDATE TAB_BBW_DATABLOCK SET REC_ID = :B3 WHERE REC_ID = :B2+:B1+1

SYMPTOMS THAT LED TO THE FINDING:
        Wait class "Concurrency" was consuming significant database time. (24%
        impact [375 seconds])
```

*Fig. 7A*

Example 2: ADDM report (continued)

```
FINDING 3: 9.5% impact (149 seconds)
-----------------------------------
Contention on buffer cache latches was consuming significant database time.

RECOMMENDATION 1: SQL Tuning, 4.3% benefit (68 seconds)
     ACTION: Run SQL Tuning Advisor on the SQL statement with SQL_ID
        "4vxy8fv4y3dhd".
        RELEVANT OBJECT: SQL statement with SQL_ID 4vxy8fv4y3dhd
        UPDATE TAB_BBW_DATABLOCK SET REC_ID = :B3+:B2+1 WHERE REC_ID = :B1

RECOMMENDATION 2: SQL Tuning, 4.3% benefit (68 seconds)
     ACTION: Run SQL Tuning Advisor on the SQL statement with SQL_ID
        "90n4zy8h6375p".
        RELEVANT OBJECT: SQL statement with SQL_ID 90n4zy8h6375p
        UPDATE TAB_BBW_DATABLOCK SET REC_ID = :B2 WHERE REC_ID = :B2+:B1+1

SYMPTOMS THAT LED TO THE FINDING:
      Wait class "Concurrency" was consuming significant database time. (24%
      impact [375 seconds])

FINDING 4: 3.5% impact (56 seconds)
-----------------------------------
Hard parsing of SQL statements was consuming significant database time.

NO RECOMMENDATIONS AVAILABLE

ADDITIONAL INFORMATION: Hard parses due to cursor environment mismatch were
         not consuming significant database time.
         Hard parsing SQL statements that encountered parse errors was not
         consuming significant database time.
         The shared pool was adequately sized to prevent hard parses due to
         cursor aging.
         Hard parses due to literal usage and cursor invalidation were not
         consuming significant database time.

SYMPTOMS THAT LED TO THE FINDING:
      Parsing of SQL statements was consuming significant database time. (3.7%
      impact [59 seconds])

~~~~~~~~~~~~~~~~~~~~~~~~~~~~~~~~~~~~~~~~~~~~~~~~~~~~~~~~~~~~~~~~~~~~~~~~~~~~~
ADDITIONAL INFORMATION
----------------------

An explanation of the terminology used in this report is available when you
run the report with the 'ALL' level of detail.

The analysis of I/O performance is based on the default assumption that the
average read time for one database block is 5000 micro-seconds.

Wait class "Administrative" was not consuming significant database time.
Wait class "Application" was not consuming significant database time.
Wait class "Cluster" was not consuming significant database time.
Wait class "Commit" was not consuming significant database time.
Wait class "Configuration" was not consuming significant database time.
CPU was not a bottleneck for the instance.
Wait class "Network" was not consuming significant database time.
Wait class "Scheduler" was not consuming significant database time.
Wait class "Other" was not consuming significant database time.
Wait class "User I/O" was not consuming significant database time.

The flushing of snapshots 9 and 10 took 47 seconds which is 25% of the
analysis period time. This may reduce the reliability of the ADDM analysis.
```

Fig. 7B

TIME MODEL

CROSS-REFERENCES TO RELATED APPLICATIONS

This application is a non-provisional application of and claims benefit to U.S. Provisional Application No. 60/500864, filed Sep. 5, 2003, which is incorporated by reference in its entirety for all purposes.

The present application incorporates by reference for all purposes the entire contents of the following:

U.S. application Ser. No. 10/775,531, entitled, "AUTOMATIC DATABASE DIAGNOSTIC MONITOR ARCHITECTURE", filed Feb. 9, 2004; and U.S. application Ser. No. 10/775,733, entitled "CAPTURING SESSION ACTIVITY AS IN-MEMORY SNAPSHOTS USING A TIME-BASED SAMPLING TECHNIQUE WITHIN A DATABASE FOR PERFORMANCE TUNING AND PROBLEM DIAGNOSIS", filed Feb. 9, 2004.

BACKGROUND OF THE INVENTION

The present invention generally relates to databases and more specifically to apparatus and methods for quantifying the impact of wasteful operations on a database system.

Enterprise databases continue to grow in size and number resulting in increased systems management and administrative complexity. As the size and complexity of a database system increases, the likelihood that performance problems may result also increases.

Correction of a problem is often expensive and time-consuming (e.g., some database performance problems are due to improperly written applications that can take many months or years to rewrite); thus, it may not be feasible to correct all the problems that are detected. Eventually, a database administrator may analyze the performance problems and attempt to determine which problems should be corrected first. In some cases, the database administrator may fix what the administrator deems as the most serious problems to the database system. The database administrator may determine that the problems are the most serious from prior experience or by the class of problem that is being experienced. For example, an administrator may deem hard parses to be the most serious. Although a database administrator may think certain problems are the most serious, the problems may not be. Also, some database administrators may fix the problems that are most easily solved. Thus, the problems that impact database system performance the most may not be a high priority for correction or may not be fixed at all.

Accordingly, methods and apparatus are needed to quantify the impact of performance problems on a database system.

BRIEF SUMMARY OF THE INVENTION

Embodiments of the present invention generally relate to quantifying the impact of wasteful operations on a database system. In one embodiment, one or more operations that are determined to be wasteful are received. The impact of the wasteful operations on performance in a database may then be quantified. The database is monitored to determine when a wasteful operation is being performed. When a wasteful operation is detected, a time value is recorded of the time spent on processing the wasteful operation. The time value is stored and used to quantify an impact of a performance problem in a database. The time value may be stored and associated with other time values that are recorded for the same wasteful operation. Thus, the impact of wasteful operations that are performed and processed in a database may be determined.

In one embodiment, a method for quantifying an impact of wasteful operations in a database is provided. The method comprises: receiving one or more operations that are determined to be wasteful in the database; detecting when wasteful operations are being performed; recording a time value that is spent on the wasteful operation; and storing the time value, wherein the time value is used to quantify the impact of a performance problem in the database.

In another embodiment, a method for quantifying wasteful operations in a database is provided. The method comprises: receiving a plurality of operations that are determined to be wasteful in the database; detecting when wasteful operations are being performed; recording a plurality of time values for time spent on performing the wasteful operation; and storing the plurality of time values, wherein time values are associated with a wasteful operation that the time values were recorded for, wherein the time values are used to quantify a performance problem in the database.

In yet another embodiment, a method for quantifying an impact of wasteful operations in a database is provided. The method comprises: determining one or more operations that are determined to be wasteful in the database; determining when to monitor the one or more operations, wherein the one or more operations are monitored when the one or more operations are being processed in the database; detecting when wasteful operations are being performed; quantifying an impact of the wasteful operation; and storing a value that quantifies the impact of the wasteful operation for a performance problem in the database.

Embodiments of the present invention may be included in a computer program product stored on a computer-readable medium.

A further understanding of the nature and advantages of the invention herein may be realized by reference of the remaining portions in the specifications and the attached drawings.

BRIEF DESCRIPTION OF THE DRAWINGS

FIGS. 7A and 7B depict an example of a report according to one embodiment of the present invention;

DETAILED DESCRIPTION OF THE INVENTION

Overview

Figure 1:
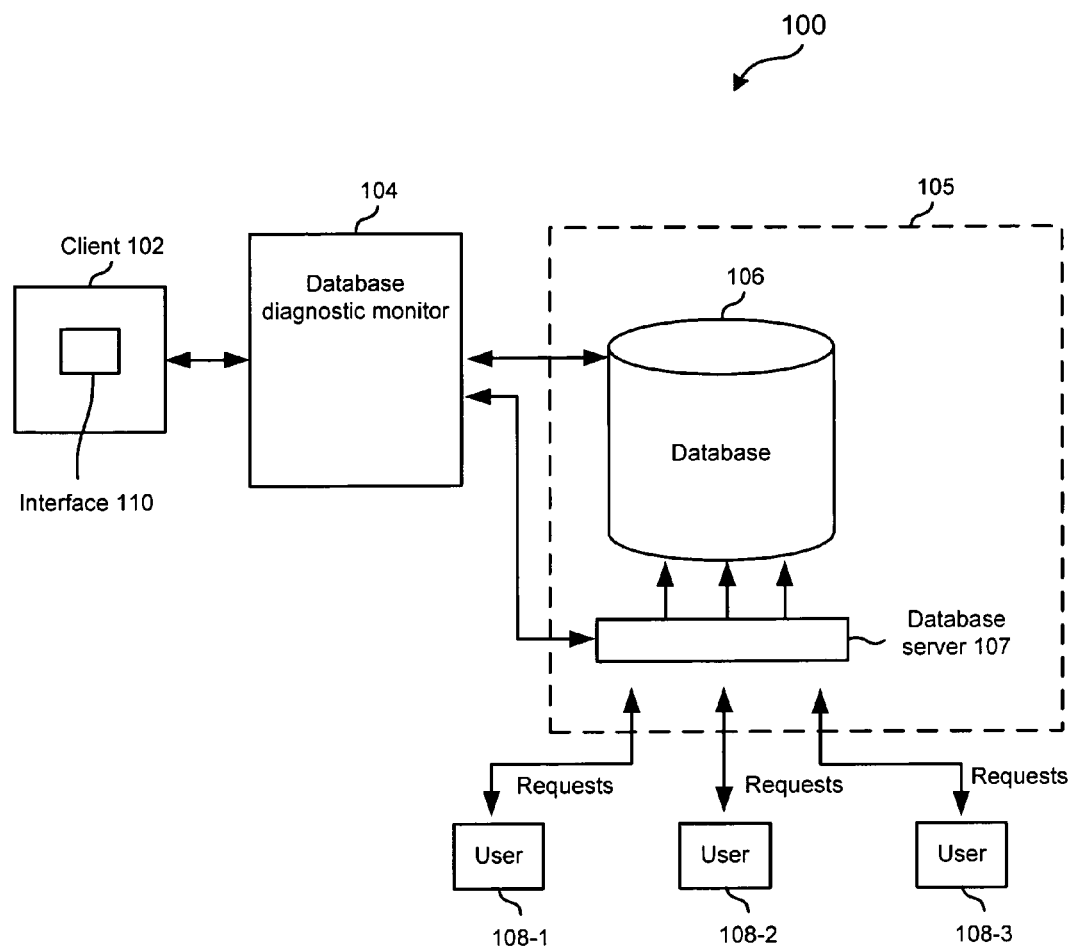
FIG. 1 depicts a system for diagnosing performance problems in a database system according to one embodiment of the present invention.

FIG. 1 depicts a system 100 for diagnosing performance problems in a database system according to one embodiment of the present invention. System 100 includes a client 102, an automatic database diagnostic monitor (ADDM) 104, a database system 105, and one or more users 108.

Figure 12:
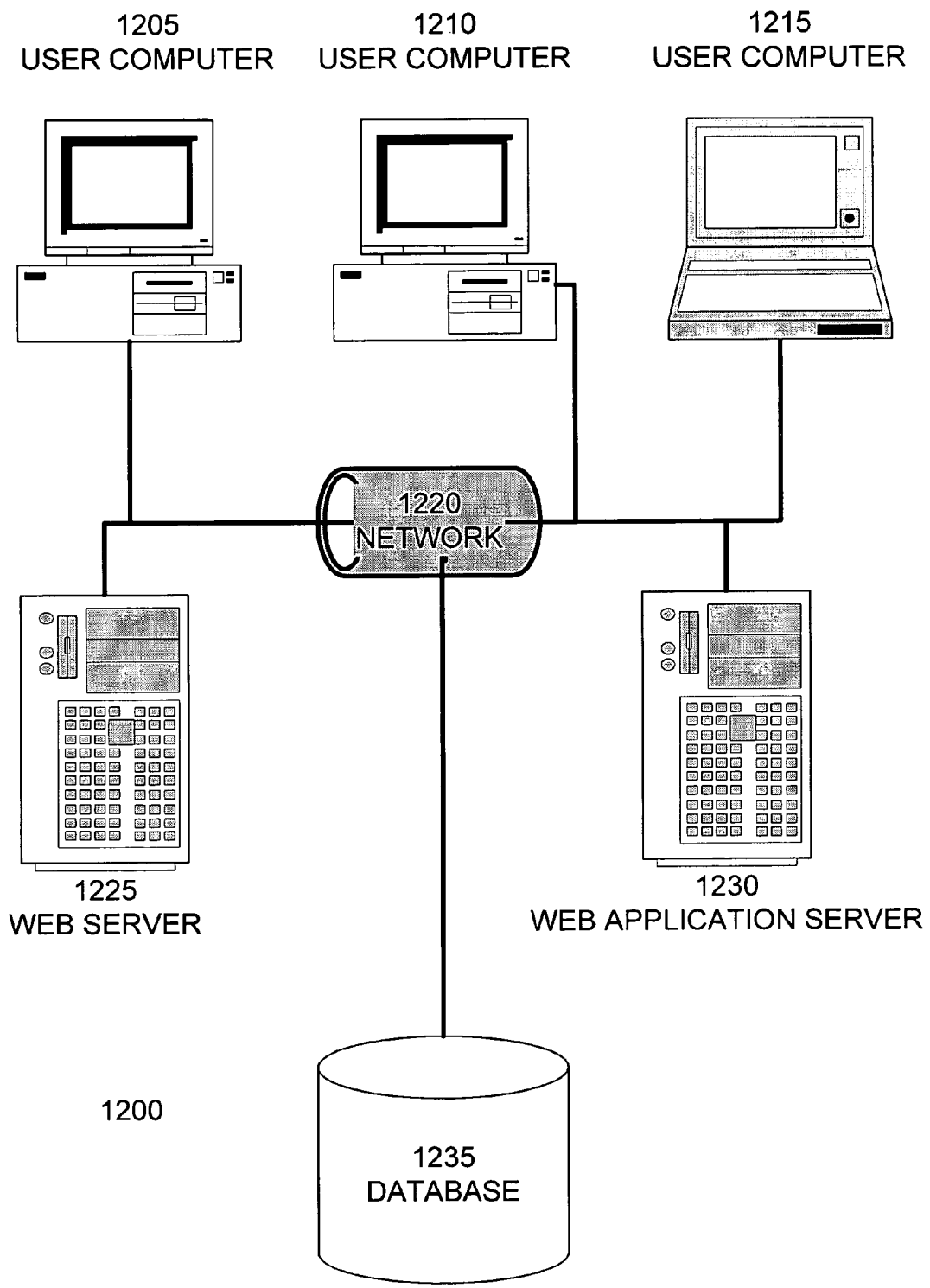
FIG. 12 is a block diagram of a database system for implementing an embodiment of the invention.

In one embodiment, database system 105 includes a database 106 and database server 107. Database server 107 is configured to receive and process requests for database 106. Database system 105 may be any database system and a person skilled in the art will appreciate other components and variations to database system 105. FIG. 12 provides a general description of a database system.

Users 108 send requests for operations to be performed in database 106. The operations include reading data in database 106, writing data to database 106, updating data in database 106, etc. For example, the requests include SQL statements that cause operations to be performed in database 106. The interaction of the users 108 with database 106 using requests is known in the art and a person of skill in the art will appreciate how database systems may be used.

ADDM 104 is configured to perform a holistic analysis of operations that were performed in database system 105. ADDM 104 receives information for operations that were monitored in database 105. In one embodiment, the information includes statistics determined using a time model and a wait model, both of which will be described in more detail below. The time model and wait model quantify an impact of certain operations in database system 105. For example, the time model and wait model are used to determine time values that quantify the impact of operations in database system 105.

ADDM 104 is configured to perform a self-diagnosis of performance problems. The diagnosis includes determining a set of rules that detect and categorize one or more possible performance problems that may occur. Operations in database 106 are detected and information is recorded. Information collected is analyzed to determine if a condition is satisfied for a rule, thus indicating a performance problem associated with the rule may exist. In one embodiment, the condition may be satisfied when a threshold is reached. For example, when a certain time value for an operation is reached, the operation may be considered a performance problem. Also, the time value may be expressed as a certain percentage of time recorded for all operations. Other ways to measure the impact using the time values recorded may also be appreciated.

In one embodiment, ADDM 104 first reviews rules for general performance problems and then drills down to more narrow performance problems. Thus, a coarse granularity of performance problems is first reviewed and then finer granularities of the performance problems are reviewed until a root problem is identified. The root problem may be at any of the granularities reviewed and multiple root problems may be found.

In one embodiment, as will be described in more detail later, a performance problem classification system is reviewed to determine a root problem. In one embodiment, possible performance problems are determined and categorized in a structure, such as a rules tree. Each node of the tree has one or more rules associated with it along with conditions that determine whether the rules are satisfied. If a rule is satisfied at a node, a performance problem may exist.

In one embodiment, ADDM 104 traverses the rules tree by reviewing performance problems from a coarse granularity to a finer granularity. The rules tree may include symptoms, which are performance problems that may lead to other performance problems and to finally, a root performance problem. If a symptom does not lead to a root problem, the symptom may also be considered a root problem If a specific problem exists at one level of the rules tree, ADDM 104 may determine other nodes that are connected to the current node. These connected nodes are performance problems that are related to and may be the cause of the performance problem of the parent node. As ADDM 104 traverses the rules tree, finer granularities of performance problems are determined until a root problem is determined.

Once a problem is determined, a recommendation for a solution may be determined. In one embodiment, the solution may be determined using a set of recommendation rules. The operation that caused the problem may be determined and information captured about the processing that was performed in database system 105 for the operation may be retrieved. The information is reviewed and a recommendation rule is used to determine a recommendation for a solution for the problem. In one embodiment, the recommendation is specific to requests that caused the problem and is not a generic recommendation. For example, the recommendation may be change the request that caused the operation to be performed to a different request. Also, rationales for making the changes may be output. The rationales may be that a request is causing a certain operation to be performed or that a certain amount of time is being spent on some operations.

ADDM 104 may organize any diagnostics performed in a report and send them to client 102 for display on an interface 110. In one embodiment, the diagnostics are automatically performed in a self-diagnosis. Thus, the diagnosis is run automatically and may detect problems before they cause a fatal error in database system 105. Also, client 102 may request, through interface 110, that certain diagnostics be performed by ADDM 104. For example, a determination if certain performance problems exist may be requested. ADDM 104 may process the requested diagnostics and return a report to interface 110. Thus, diagnosis may be performed on-demand.

The report that ADDM 104 generates may include the root problem found, any symptoms that were reviewed to determine the root problem, and also areas where no problems were found. Thus, a user may focus on the problems that were found and the symptoms that caused the problem. Also, because the areas where no problems were found are reported, a user does not have to waste time looking at those areas of database system 105 for a problem.

The time model and wait model will now be described. Both models are used to collect information that is used to quantify the impact of a performance problem in database system 105. The information is then used to determine performance problems in database system 105.

The Time Model

The time model is used to quantify of the impact of wasteful operations on database system 105. In one embodiment, the impact of wasteful operations is measured using time values. For example, the time value may measure the time spent processing a wasteful operation in database 106.

By quantifying the impact of wasteful operations in database system 105, a user may measure the impact of possible corrective actions before they are actually taken. For example, because wasteful operations are quantified in a time value, if a wasteful operation is corrected, the impact of correcting the wasteful operation is known because part of or all of the time spent on the operation may be eliminated.

In one embodiment, database time is measured using the time model. In one embodiment, database time is different from response time. The response time is the time a user 108 waits for a request to return from database system 105. Database time is the time spent in database server 107 servicing the request. In one embodiment, database time does not include the network portion of the user's response time. The network portion may include the time spent sending the request to database server 107 and the time spent to send the results to users 108. Also, parts of a request may be executed in parallel by different executing threads of database server 105. The threads are processes that operate to perform a task. If parts of the request are executed in parallel within the database system 105, the database time is the sum of all the time spent in the parallel executing threads of execution. This means that database time for a request executed in parallel may be much greater than the response time for the same request.

Operations that, when performed in database system 105, may be wasteful are determined. In one embodiment, a wasteful operation is an operation that may be attributed to some type of performance problem. For example, a wasteful operation may be an operation that does not need to be performed. Also, a wasteful operation may be an operation that may be performed more efficiently if performed in a different way. In one embodiment, operations that may be considered wasteful include hard parses, soft parses, configuration problems, improperly sized caches, and other operations are listed in Appendix A. It will be understood that other operations may be appreciated.

In one embodiment, the time values spent on wasteful operations are stored in a database. The actual operations that were processed in database system 105 for which the time value was recorded may also be associated with the time value that is stored. Also, accumulated time values on time spent on all operations for each wasteful operation may be stored. For example, time may be accumulated by request types, such as by SQL statements. Thus, a when a certain SQL statement is performed, database time is recorded for the operation. In one embodiment, database time for a request that is performed for multiple users is recorded. An active session sample, which is described later, may then be used to determine users 108 that requested the operation when it is determined that the operation may be a performance problem. For example, a time value for a hard parse operation requested by a first user 108-1 may be stored. If another request by a user 108-2 caused a hard parse operation, a time value for that hard parse operation is stored. Also, an accumulated time value for hard parse operations that includes the time values from the hard parse operations associated with the requests for user 108-1 and user 108-2 is stored and associated with the general category of hard parse operations.

Figure 2:
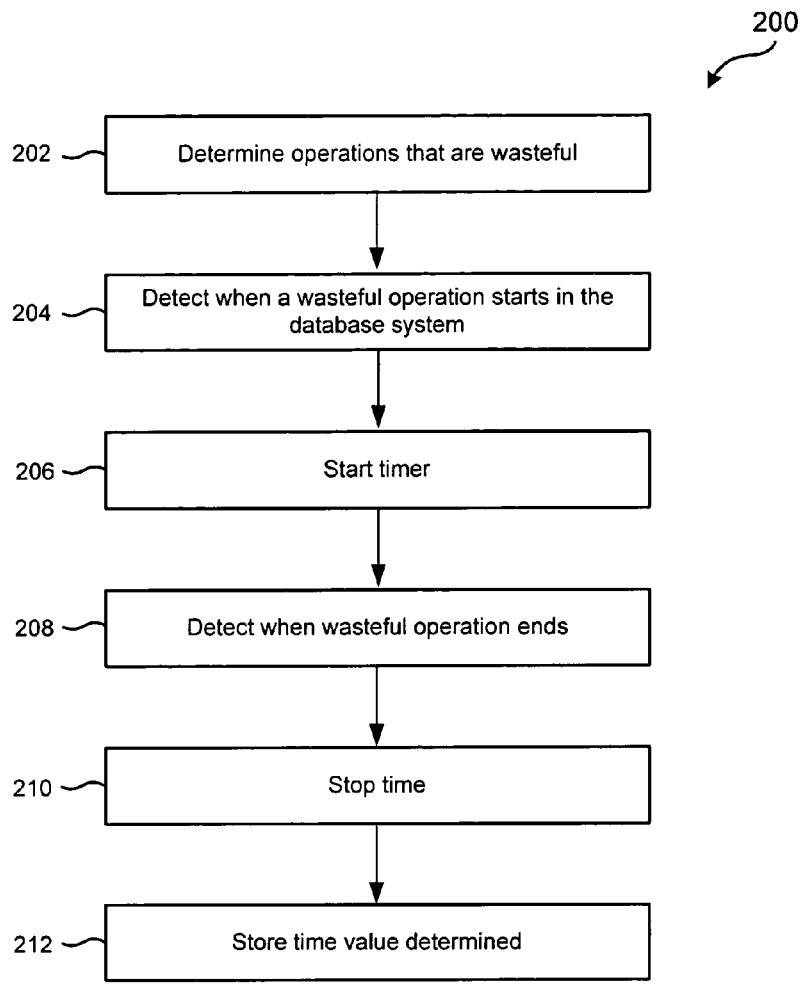
FIG. 2 depicts a simplified flowchart and a method for quantifying an impact of wasteful operations on database system according to one embodiment of the present invention.

FIG. 2 depicts a simplified flowchart 200 and a method for quantifying an impact of wasteful operations on database system 105 according to one embodiment of the present invention. In step 202, operations that would be wasteful are determined. The operations determined to be wasteful may be operations as described in Appendix A.

In one embodiment, rules associated with each wasteful operation may also be determined. The rules include conditions that are defined by the time model in determining when a wasteful operation is being performed. For example, a rule may include a condition that when a hard parse is being performed for a request, a hard parse wasteful operation is being performed.

In step 204, a condition check detects when a wasteful operation starts in database system 105. In one embodiment, when a condition is satisfied, an indication is made that a wasteful operation has begun.

In step 206, a timer for the wasteful operation is started. The operation may be timed using any methods capable of recording a time value, such as using a counter to time the wasteful operation. In one embodiment, the timer is started when the processing of a wasteful operation in database system 105 is detected. Thus, database time spent processing wasteful operations in database system 105 is recorded.

In step 208, a condition check detects that the wasteful operation ends. In one embodiment, when a condition is satisfied, an indication is made that a wasteful operation has ended. For example, a condition may be associated to an event that indicates when the wasteful operation ends.

In step 210, the timer for the wasteful operation is stopped. Accordingly, the time value that represents the time spent processing the operation in database system 105 has been recorded. The time value represents the time that is deemed to be wasteful for the operation that was performed. Accordingly, the timer may have timed the time spent processing wasteful operations in database system 105 rather than time spent waiting for a resource and time spent in communication between database server 105 and users 108.

In step 212, a time value for the time spent on the wasteful operation is stored. Also, the total time that is spent on a certain category of a wasteful operation in database 106 may also be stored.

The Wait Model

The wait model is a measurement of time spent in database server reads waiting for external events to complete. These events may be the completion of some requested service, such as a disk read, or they can be the release of some shared resource by another database server thread. This time (or some portion of it) is usually considered wasteful since the request cannot be further processed until the wait is finished. In one embodiment, wait classes are determined that categorize wait events that may occur in database system 105. For example, wait classes may include an application, an administration, concurrency, configuration, user I/O, network communications, and idle wait classes.

An application wait class includes lock waits caused by row level locking or explicit lock commands. Administration wait classes include database administrator commands that cause all other users to wait as in an index rebuild. A commit wait class includes a wait for redoing log write confirmation after a commit operation. A concurrency wait class includes concurrent parsing and buffer cache and lock contention waits. A configuration wait class includes wait time due to undersized buffer space, log file sizes, buffer cache size, shared pool size, ITL allocation, HW enqueue contention, and ST enqueue contention. A user I/O wait class includes waits for blocks to be read off a disk. A network communications wait class includes waits for data to send over the network. An idle wait class includes wait events that signify the session is inactive.

The wait model is the timing of events where the current thread of execution has to wait for some service to be performed externally (such as a disk read) or for some shared resource to be released by another thread of execution. Thus, a wait is the case when the current thread of execution cannot proceed until some external event happens. The time model, in contrast, captures all time in a thread of execution spent on a specific operation, inclusive of any wait time occurring in this operation.

The Generation of a Rules Tree

In one embodiment, ADDM 104 is configured to traverse a rules tree to determine a performance problem. The rules tree may be a directed acyclic graph or dag. Each node in the tree is associated with a set of rules that examine a set of statistics (e.g., time spent on operations). Each rule has a threshold for the set of statistics that is examined. In one embodiment, the threshold is time based, typically a percentage of the total database time for a time period under analysis. A node is set to fire (i.e., is selected) if the rule threshold is surpassed, upon which further analysis is done to determine the problem, i.e. more data pieces are looked at and are correlated with each other. If a root problem is found recommendations will be generated. If a problem is detected by this node, it may be necessary to invoke nodes under these nodes (children of the current node) to further drill down. Accordingly, the finding by the parent node may be just a symptom (i.e., not a problem) and is associated with the problems found by the child nodes, if any. If the rule threshold is not exceeded, then a "no-problem is found" message is generated and no drill downs are performed. Thus, areas of the rules tree may be eliminated as not causing performance problems. This may be referred to as pruning the rules tree and has a bearing on the efficiency of the problem detection by ADDM 104. Each problem has an impact associated with it and can be used by the user to order the set of issues affecting the database system 105.

The rules tree is organized in such a way that time associated with the symptoms that a parent is responsible for is always greater than or equal to the sum of the times for its child's symptoms. For example, a symptom node may be Parses, and children nodes may be Hard parses and Soft Parses. The total time spent in hard and soft parses is combined into the time for the Parses node. Thus, generating the rules tree involves piecing the various nodes together and figuring out the relationship between them. In one embodiment, the rules tree is a static entity (not dynamically generated or modifiable by users).

Figure 3:
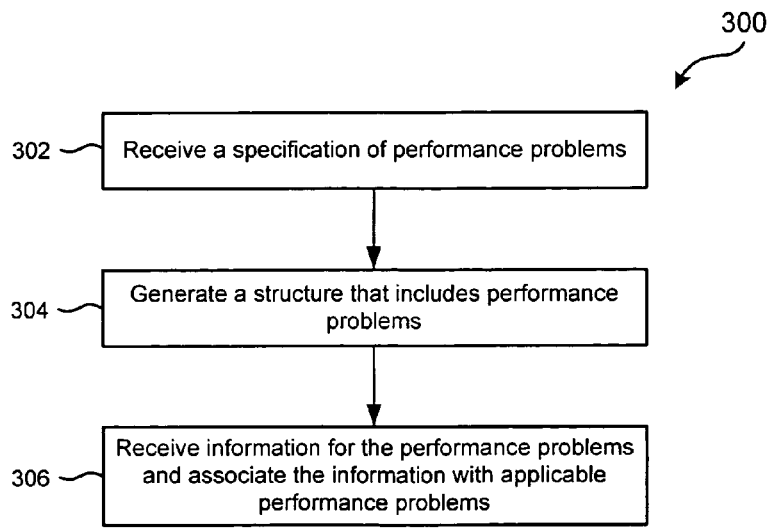
FIG. 3 depicts a simplified flowchart for generating a rules tree according to one embodiment of the present invention.

FIG. 3 depicts a simplified flowchart 300 for generating a rules tree according to one embodiment of the present invention. In step 302, a specification of performance problems is received. The specification includes performance problems that may occur while processing operations in database 105. For example, performance problems may include operations, such as hard parses, soft parses, and other operations listed in Appendix A.

Performance problems may include symptoms that may lead to root problems. The performance problems range from problems that are considered at a coarse granularity to problems at a finer granularity. For example, a performance problem may be "parses" at a first level and a second level may include the problems "hard parses" and "soft parses".

Additionally, rules associated with the performance problems are specified. The rules determine when a performance problem may be considered a problem. For example, a rule may specify that if a certain amount of time is spent on an operation, a performance problem may exist. A rule may be, for example, if 100 seconds were spent on hard parses for a number of operations, then a performance problem may exist for hard parses. A rule may also specify that a performance problem exists if a certain percentage of time is spent on an operation.

In step 304, a structure is generated that includes the performance problems. In one embodiment, the structure generated is in the form of a rules tree that may be traversed to determine a root problem. Relationships (e.g., parent/child relationships) associated with the nodes are stored in a database and those relationships are traversed to determine a root problem. In one embodiment, a first structure is generated for the time values determined for a wait model and a second structure is generated for the time values associated with the time model. The structures for the time model and wait model may include different performance problems or may include the same performance problems.

In step 306, information is received for the performance problems. For example, time values generated using the wait model and time model are received. The time values are then associated with the applicable performance problems. For example, time spent on hard parses may be monitored using the time model and wait model. The time values are then associated with the performance problems for hard parses.

Accordingly, rules trees for the wait model and time model are generated with the appropriate information that has been recorded. The rules trees may then be analyzed by ADDM 104 to determine where performance problems may exist.

Diagnosing Performance Problems in the Database

Figure 4:
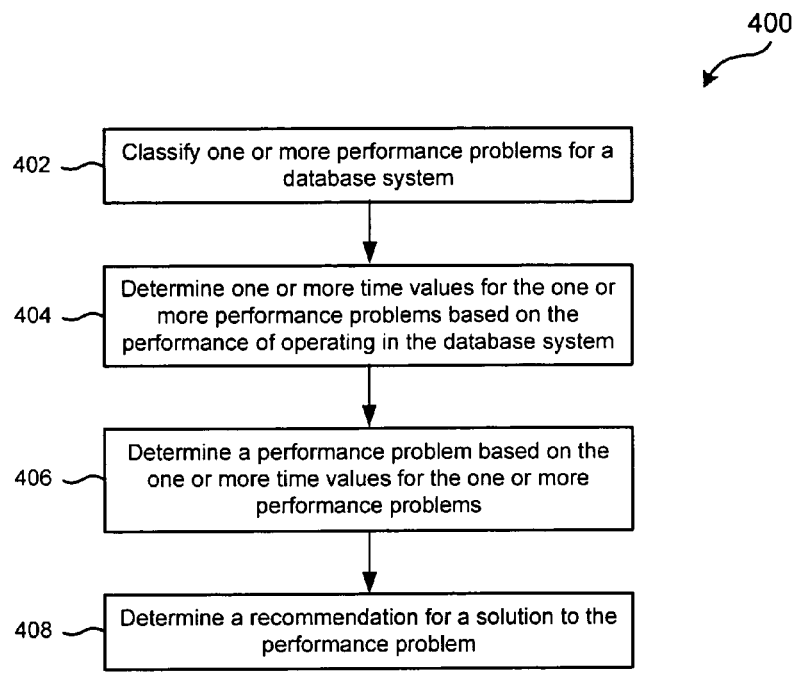
FIG. 4 depicts a simplified flowchart for diagnosing performance problems in a database system according to one embodiment of the present invention.

FIG. 4 depicts a simplified flowchart 400 for diagnosing performance problems in database system 105 according to one embodiment of the present invention.

In step 402, classifications for one or more performance problems in database system 105 are received. The performance problems may be classified as symptoms that lead to a root problem. For example, as different symptoms are encountered, the symptoms may lead to a root problem. Also, in some cases, symptoms may also be considered a root problem. A root problem may be considered a problem that may not lead to other problems. Also, a root problem may be a problem that has the greatest impact on performance in database system 105 compared to the symptoms. In one embodiment, the performance problems are classified in that certain operations may be associated with the performance problem. For example, a performance problem may be hard parse operations.

The one or more performance problems may have rules associated with them. For example, rules may be associated with a problem that include conditions that, when met, indicate that a problem may exist. In one embodiment, thresholds for the rules may be specified by a user. The threshold may be a time value or a percentage of total time spent. The percentage may compare the time spent on hard parse operations compared to total time spent processing operations in database 106. Also, a low time value for a rule may be specified. In this case, the rule may be triggered more often. Thus, it is more likely that an operation for the rule may be flagged as a possible performance problem.

In step 404, one or more database time values for the one or more performance problems are determined. In one embodiment, the database time values are determined using the wait model and the time model. As discussed above, the wait model and time model quantify the impact on database system 105 for the performance problems. For example, the time model measures database time. Database time is a concept that measures the amount of time taken in processing a request in database 106. In one embodiment, database time is distinct from user response time, which is a cumulative value that includes the time users 108 wait for resources to become available for processing the request and time spent in communication between server 107 and users 108 in performing the request.

In step 406, a performance problem based on the one or more time values for the one or more performance problems is determined. In one embodiment, a rules tree is traversed where different nodes are analyzed to determine if the time values associated with them trigger the rule associated with it. For example, a rule may specify that if a certain amount of time is spent for an operation associated with a node in the rules tree, then it is determined that a performance problem may exist. ADDM 104 may determine that this performance problem is a root problem. Also, ADDM 104 may determine that a finer granularity of a problem may exist and may try to drill down the rules tree to determine a more specific problem. In this case, ADDM 104 analyzes rules that are related to the identified node to determine if any rules are satisfied based on the time values associated with the related nodes. If any related nodes have their conditions satisfied, then a performance problem may exist for those nodes. The process of traversing the rules tree continues until it is determined that a root problem exists.

In step 408, a recommendation for a solution is generated for the performance problem determined in step 406. In one embodiment, the recommendation for the solution indicates which operations are causing the performance problem and in addition suggests recommendations for solutions to the operations that may alleviate the problem. Also, the recommendation may include actions to should be taken and the rationales behind taking the actions. In one embodiment, the recommendation for the solution, if performed, may reduce the time spent in processing the operation in database system 105.

Additionally, ADDM 104 may determine areas where the problems do not exist. For example, operations that have been performed that are not causing problems may be determined and also outputted. In this case, a user may disregard reviewing these operations and the results thereof when attempting to fix the performance problems of database system 105.

Figure 5:
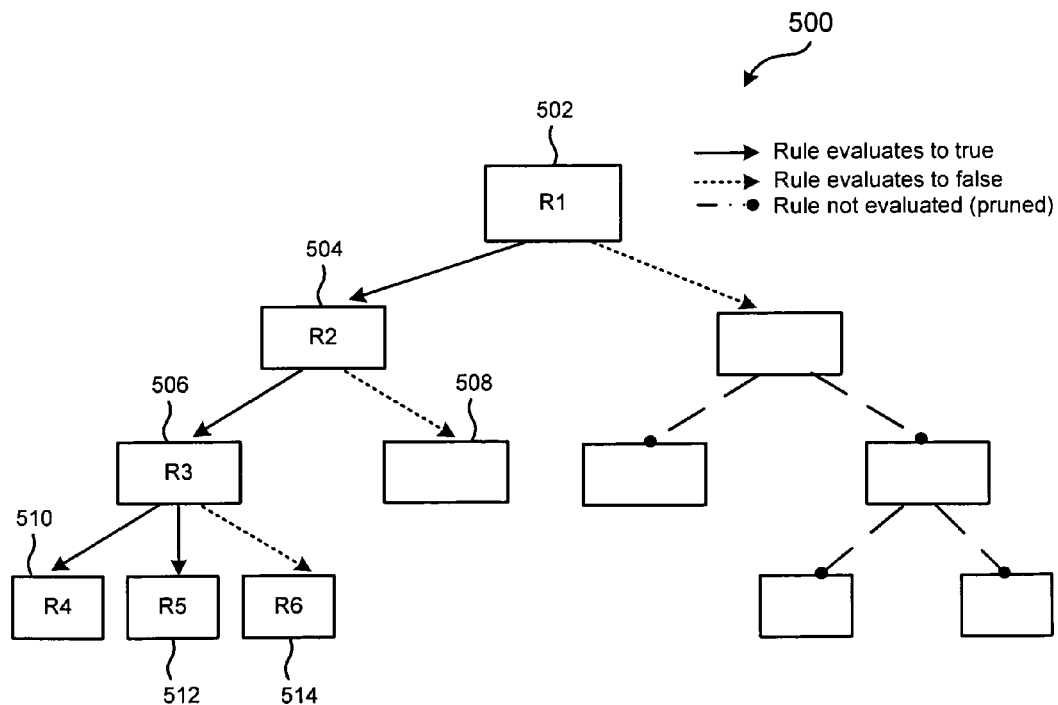
FIG. 5 depicts an example of a rules tree according to one embodiment of the present invention.

FIG. 5 depicts an example of a rules tree 500 according to one embodiment of the present invention. The rules tree includes one or more rules that are evaluated for each node.

In this example, a first rule R1 for a node 502 evaluates to true and its child node 504 is processed next. Node 502 is designated as a first symptom #1. A second rule R2 for a node 504 evaluates to true and its child nodes 506 and 508 are processed next. Node 504 is designated as a symptom #2. A third rule R3 for a node 506 evaluates to true and its child nodes 506 and 508 are processed next. Node 506 is designated as a symptom #3.

A fourth rule R3 for a node 510 evaluates to true, and fifth and sixth rules R5 and R6 for nodes 512 and 514, respectively, evaluate to false. In this case, node 510 does not have any child nodes and is thus considered a root problem. Nodes 502, 504, and 506 that were traversed to determine the root problem are considered the symptoms.

In one example, the first rule R1 may have been system waits. In one example, the threshold may set to a low value so that most system waits are analyzed. However, it does not mean there is a performance problem just because a system wait rule is triggered. It may be determined that the time spent is not significant or cannot be corrected.

The second rule R2 may be latch waits. The latch waits may be evaluated to true because a certain time value was recorded. For example, latch waits may account for greater than 1% to total elapsed database time. The rule also calls for its child rule to be evaluated.

The third rule R3 may be shared pool latch. This operation is a more specific operation than a latch wait. A certain time value associated with a shared pool latch causes the rule to be triggered. The rule also calls for its child rule to be evaluated.

The fourth rule R4 may be hard parse analyze. This rule does not have any children and thus is considered a root problem. In one embodiment, recommendation rules associated with node 510 are used to determine a recommendation for a solution to the root problem. Also, recommendations for correcting the symptoms determined may be provided.

Determining a Recommendation for a Performance Problem

Figure 6:
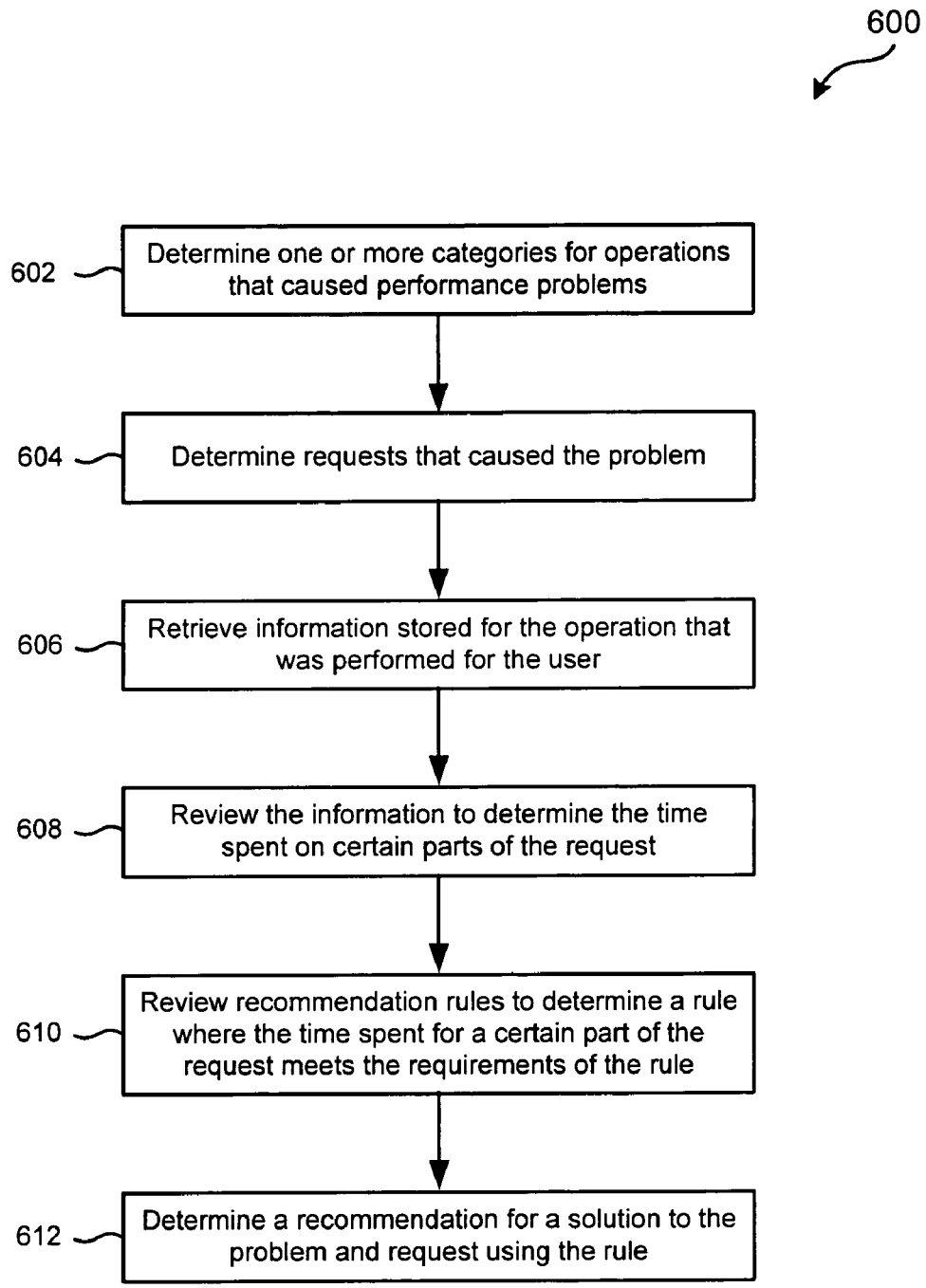
FIG. 6 depicts a simplified flowchart of a method for determining a recommendation for a solution to a performance problem according to one embodiment of the present invention.

FIG. 6 depicts a simplified flowchart 600 of a method for determining a recommendation for a solution to a performance problem according to one embodiment of the present invention.

In step 602, one or more categories for operations that caused the performance problem are determined. The categories may be the operations determined in step 406 of FIG. 4 or operations associated with nodes 502-510 of FIG. 5.

In step 604, the requests made by users 108 that caused the performance problem are determined. For example, an SQL statement may be the operation that is causing the problem identified. The SQL statement may have been structured in a way that a hard parse occurs in database 106. For discussion purposes, a single operation for a request from a user 108 is assumed but multiple requests may be determined for a performance problem.

In step 606, information is retrieved that was stored for the operation that was performed for user 108. For example, the information may include what operation was processed, what resources were accessed, how long the operation took to process, etc.

In one embodiment, the information that was stored may have been captured using snapshots of active sessions that were taken during a certain time interval. The snapshots of information include the operations that were being performed at a certain time and what the operations were doing. The operation may be determined in the snapshots and how the operation was processed may be determined based on a series of snapshots that are pieced together using statistically valid techniques. The snapshots of information over a certain time interval show what an operation is doing during the time interval. If a snapshot was taken every second, then the information for the operation at every second may be analyzed as a whole. The process of capturing the snapshots of information will be described in more detail below.

In step 608, the information captured is reviewed to determine the time spent on certain parts of the request. For example, ADDM 104 may associate a certain time value with a parse issue and then a certain time value with a hard parse issue.

In step 610, recommendation rules are reviewed to determine a recommendation rule where time spent for a certain part of the request meets the requirements of the recommendation rule. In one embodiment, each node in the rules tree is associated with one or more recommendation rules for a performance problem associated with a node. The recommendation rules classify problems and specify conditions that are met. For example, if there is a problem with data in a table that is causing a lot of time to be spent performing an operation with the table, a recommendation to optimize the table may be determined. Also, The set of recommendation rules may be used to determine which rules apply to the table. For example, if a rule is partition a table, a recommendation may be to partition the table. If the table is partitioned, however, the recommendation would not be given. Thus, recommendations are not general and depend on each situation.

In step 612, a recommendation for a solution is determined for the problem using the rule. For example, a solution may be a suggestion on how to change a request. For example, a different SQL statement based on the request may be determined. The recommendation may be to not use literals in a SQL statement but use bind variables instead. This would prevent excess hard parsing.

FIG. 7 depicts an example of a report 700 generated by ADDM 104 according to one embodiment of the present invention. As shown, report 700 includes four findings 702-1 to 702-4. Each finding 702 is associated with one or more operations. For example, finding 702-1 is associated with concurrent read and write activity. The data block that the operations were being performed in is also cited.

Each finding 702 includes an impact 704-1-704-4 on database system 105. The impact is quantified as a time value. For example, finding 702-1 includes an impact of 201 seconds, which is a 13% impact on total database time spent in database system 105. The impact in this case is the time taken in processing the operations for a finding 702 against the total database time processing operations. Thus, a user can see the impact that a performance problem has on database system 105.

Each finding 702 includes one or more recommendations 706-1-706-4. Recommendations 706 include actions 707-1-707-4 and rationales 708-1-708-4 for actions 707-1-707-4. Actions 707 indicate what may be done to alleviate the performance problem. For example, the requests that are causing the performance problem may be determined and a corrective action is recommended. For example, finding 702-1 recommends that application logic be investigated for a database block #40984 to determine the cause of high concurrent read and write activity. A user may then investigate the data block cited and determine why concurrent read and write activity is being performed. The user can thus concentrate on a certain data block in database 106.

Rationales indicate specific operations that may have caused the performance problem. For example, in finding 702-1, the SQL statement with an ID of "4vxy8fv4y3dhd" spent significant time on "buffer busy waits" for the data block. A user thus may investigate the operations cited and determine why the operation is being performed.

Symptoms 710-1-710-4 are also included. Symptoms 710 indicate which performance problems led to a root problem found. For example, symptom 710-1 indicates that a wait class "concurrency" was consuming significant time. A user may then investigate the symptoms that led to the root problem and thus does not need to determine the causes of a problem.

In some examples, such as in finding 702-4, recommendations may not be available. In these cases, additional information may be included in report 700. The additional information may include operations that may have caused a performance problem. Also, the additional information may include general information on operations rather than specific operations. For example, hard parses may be a problem but the exact requests that caused the hard parses may not have been identified.

Other areas that did not cause any problems are shown in additional information 712. The classes of problems where significant database time was not consumed are listed. Thus, a user may not need to review these areas of database system 105.

Capturing Information for Database Activity

Figure 8:
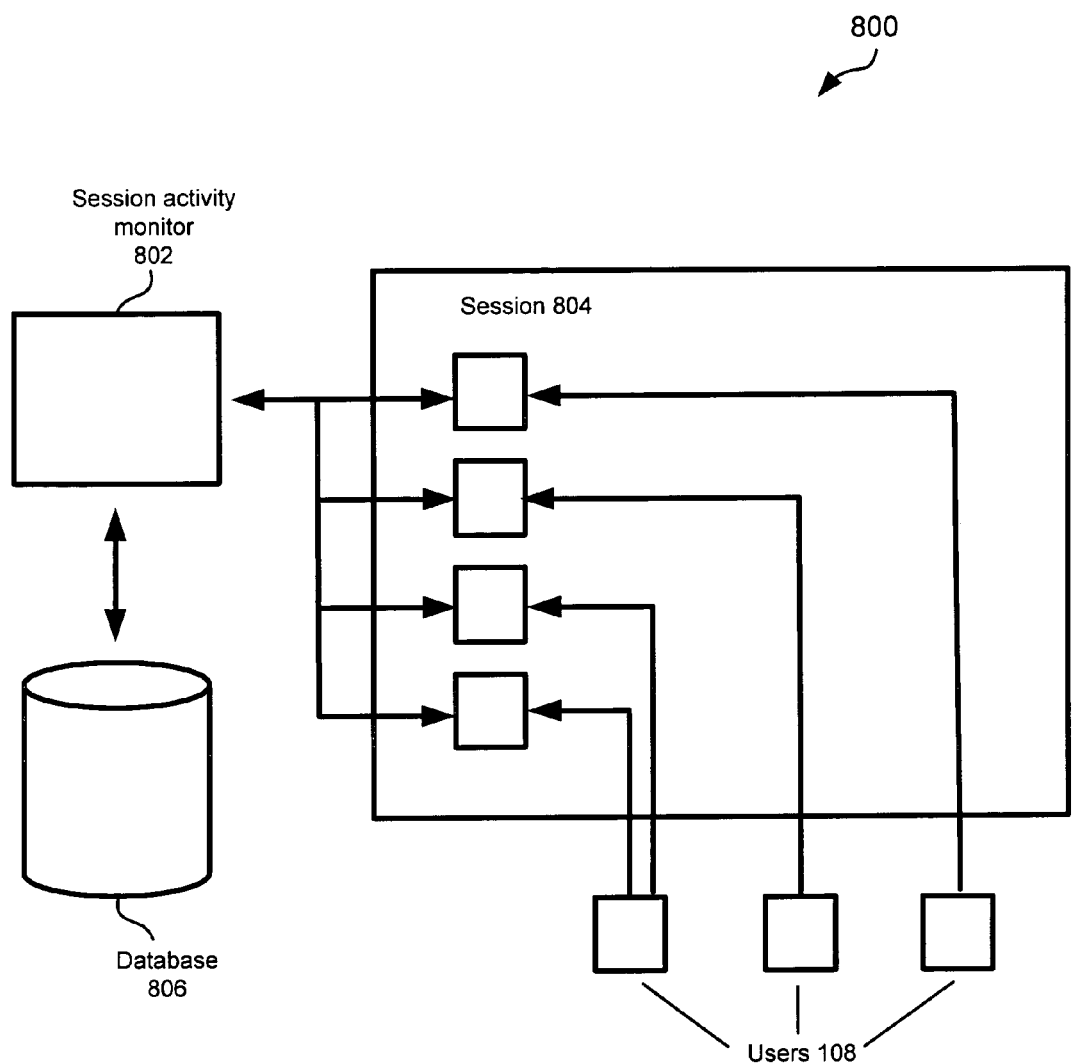
FIG. 8 depicts a system for sampling activity in the database system according to one embodiment of the present invention.

FIG. 8 depicts a system 800 for sampling activity in database system 105 according to one embodiment of the present invention. System 800 includes a session activity monitor (SAM) 802, one or more sessions 804, users 108, and a database 806.

SAM 802 is configured to capture information about sessions 804. In one embodiment, SAM 802 captures information without using a query language, such as structured query language (SQL). In one embodiment, SAM 802 is located such that access to information for sessions 804 may be captured internally in database system 105. For example, SAM 802 may be located in database system 105. More specifically, SAM 802 may be located in database server 107 such that database server 107 is effectively capturing information itself. Thus, queries for information are not necessary and may be captured from internal data structures in database system 105.

Users 108 connect to database system 105. Once connected, a session 804 is generated. Users 108 may then send requests that are processed by database system 105. The requests and any information associated with operations performed for the requests are associated with the assigned session 804. Accordingly, a session 804 may be any entity that is associated with operations being performed in database system 105. Also, a session 804 may be associated with a user 108 (e.g., a user identifier).

Sessions 804 may be, over time, active or inactive. For example, in performing an operation, session 804 may be performing some type of act in database system 105, such as retrieving data. An operation may include many database calls, which are units of work within database system 105. For example, in performing an operation, such as a SQL statement, the operation may include various phases, such as parsing, executing; fetching results, that translate to database calls. A session may be inactive between database calls, such as data for the phase may not be available yet. A session may also be inactive between operations as a user sees it. For example, the time between when a request ends and a request is received is when a session is inactive as a user sees it. The total time spent in database calls is referred to as "database time or db time". The time between operation is called "response time" and this is the time the user waits. The key difference between the two is the time spent on the network. Eventually, the operation may be completed. When the operation has been completed, additional operations may be performed for session 804 or the session may end.

Different information may be associated with a session 804. The information may include state information that provides the state of the request at the time. For example, the information includes information describing who a user 108 that requested the operation is (e.g., a user ID), what request (e.g., SQL command) is being processed, what the operation is doing (e.g., waiting, retrieving data, updating data, etc.), and other information. This information is useful when a performance problem is encountered and may be used to diagnose the problem. For example, certain requests and their activity may be viewed, how much time was spent on certain operations can be estimated, etc. and may be used in diagnosing a performance problem. This data may also be used to reconstruct the set of operations/activity in database system 105 for the time under consideration., etc. may be used in diagnosing a performance problem.

SAM 802 is configured to take snapshots of activity for sessions. In one embodiment, snapshots are combined into a sample. The sample does not include all activity for a session 804. Accordingly, a full trace of information is not taken in one embodiment.

SAM 802 is configured to capture information from sessions 804 at certain times during a time interval. For example, a time interval, such as every second, may be used for capturing information. At every interval, SAM 802 captures information from sessions 804. Thus, a snapshot of information is captured at certain times rather than a full trace of activity. A sequence of snapshots may be referred to as a sample of the session history. A set of samples do not include all information but may be sufficient to determine the activity for sessions and the database as a whole. For example, if an operation is performing an action for three seconds, a snapshot at every second will capture information for the action. When a new action is started, the next snapshot captures information about the new action. Thus, what a session 804 is doing over a period of time may be determined even though a full trace of information is not recorded. Consumers of the captured information may determine that the information is statistically significant by using well known statistical analysis before drawing conclusions.

In one embodiment, when SAM 802 determines it is time to capture information, information is captured for active sessions and not inactive sessions. By capturing information for all active sessions at certain time intervals, SAM 802 is able to capture information that may be best for diagnosing performance problems. The burden of capturing information for all sessions 804 that are active is lessened because information is captured at certain intervals. This allows information for all active sessions 804 to be recorded. Also, the burden of capturing information is lessened because information for inactive sessions is not captured. Thus, the captured information may be manageable in that the size captured is smaller and the time taken to capture the information is shorter.

The information captured may be temporarily stored in memory and then archived in database 806, or the information may be directly stored in database 806. The captured information, whether in temporary memory or on disk, is used in diagnosing problems, etc. Also, the captured information may be selectively filtered where information that is deemed important is stored in database 806.

Figure 9:
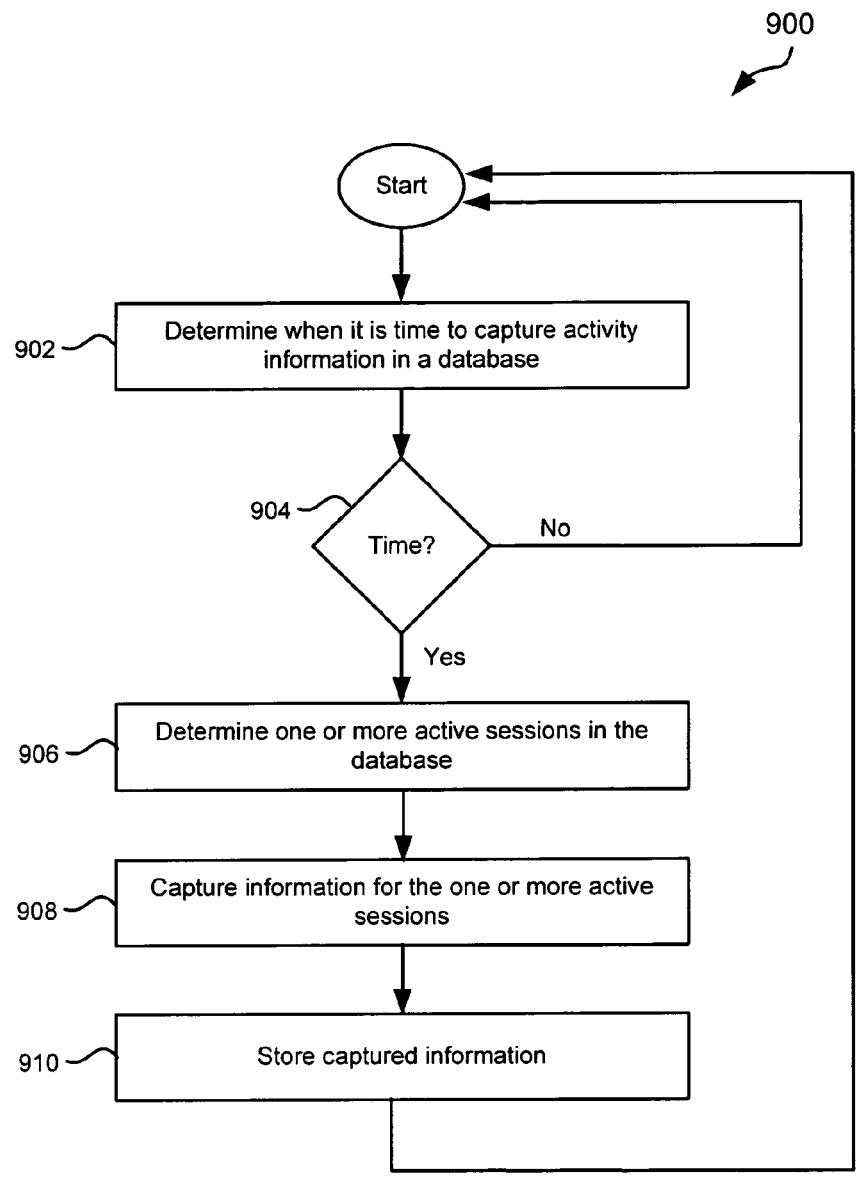
FIG. 9 depicts a simplified flowchart of a method for capturing information for session histories according to one embodiment of the present invention.

FIG. 9 depicts a simplified flowchart of a method for capturing information for session histories according to one embodiment of the present invention. In step 902, SAM 802 determines when it is time to capture activity information in database system 105. In one embodiment, a time interval is determined where information is captured periodically. For example, SAM 802 may capture information every second. Accordingly, a full trace of information is not captured in one embodiment. Rather, a sample of activity is captured where information is captured at certain time intervals.

In step 904, if it is not time to capture information, the method reiterates to step 902. If it is time, the method proceeds to step 906, where one or more active sessions in database system 105 are determined. In one embodiment, information from active sessions and not inactive sessions is captured. An active session is a session that is actively performing an operation at the time. For example, an active session may be performing a database call or a thread in database server 105 may be executing an operation. An inactive session is a session that is not doing work. For example, an inactive session may be in between database calls or waiting for a resource.

In one embodiment, a flag is set that indicates that a session 804 is active. SAM 802 then captures information for all active sessions 804. In one embodiment, a flag is set that indicates that a session 804 is active.

Although it is described that only information from active sessions are captured, it will be understood that information from inactive sessions may be captured. For example, if the number of sessions present in database system 105 is low, then information may be captured from the inactive sessions. In other embodiments, information is captured for just the active sessions. Because information is captured for active sessions, it may not be prohibitive to capture information for all sessions 804 if database system 105 has a lot of sessions 804. Also, typically, when diagnosing a problem, activity for a session 804 is reviewed to determine the problem. Time when a session 804 is inactive may be reviewed also, but the inactive time may be determined from the sequence of captured information. For example, ten snapshots of information may yield information for a session 804 at snapshot one and ten. The session may have been inactive for the time between the first and tenth snapshots and this may be determined by there not being any information for that session 804 in snapshots 2-9.

In one embodiment, ADDM 104 uses statistical techniques to ensure that the active session samples are statistically significant (from the captured information). For example, ADDM 104 determines a performance problem as described above. The performance problem indicates which operations may be causing problems. Then, ADDM 104 looks at the individual requests that were made by users 107 that caused the problem. In order to do this, the samples of active session history are analyzed. The information in different snapshots for an operation is reviewed and a model of what was recorded is developed. The model is useful in determining what a request did in database server 107 (e.g., what operations were performed). If information captured is relatively unintrusive to the operation of database system 105, then snapshots of active sessions may be taken at continuous uniform intervals. The snapshots may provide a statistically significant picture of activity in database system 105. Then, ADDM 104 may use techniques to analyze the activity to determine which operations may be causing performance problems.

In step 908, information is captured from the one or more active sessions determined in step 906. In one embodiment, internal data structures are scanned to determine what activity an active session is performing at the time. SAM 802 is then configured to capture the information from the internal data structures without using SQL in one embodiment. The internal data structures may be found in database server 107 and/or database 106. The data structures are read and information is captured.

In step 910, the captured information is stored. In one embodiment, the captured information may first be stored in temporary storage (e.g., memory). The most recent captured information may be stored in temporary storage for easier and faster access. An advantage of this is that the most recent information may be used more often in diagnosing performance problems. The information stored in temporary storage may also be archived in database 806. This information may be used in future analysis or for analysis over a greater period of time.

The method then reiterates to step 902 where another snapshot of information is captured. Accordingly, a sequence of snapshots is captured over time. The sequence of information may be very useful in diagnosing a performance problem. Although it is not a full trace of information, the snapshots may provide a representation of activity in the database that may be just as useful as the full trace. If the activity of a session is known for a periodic interval over a time period, the sequence of information may be pieced together in a statistically significant manner to determine what activity took place. The information may then be used to diagnose a performance problem. Thus, the problem may be diagnosed without burdening database system 105 with requests for full traces of all activity. Also, information is captured for all active sessions rather than only a select few. A log of information for all active sessions is thus recorded.

Figure 10:
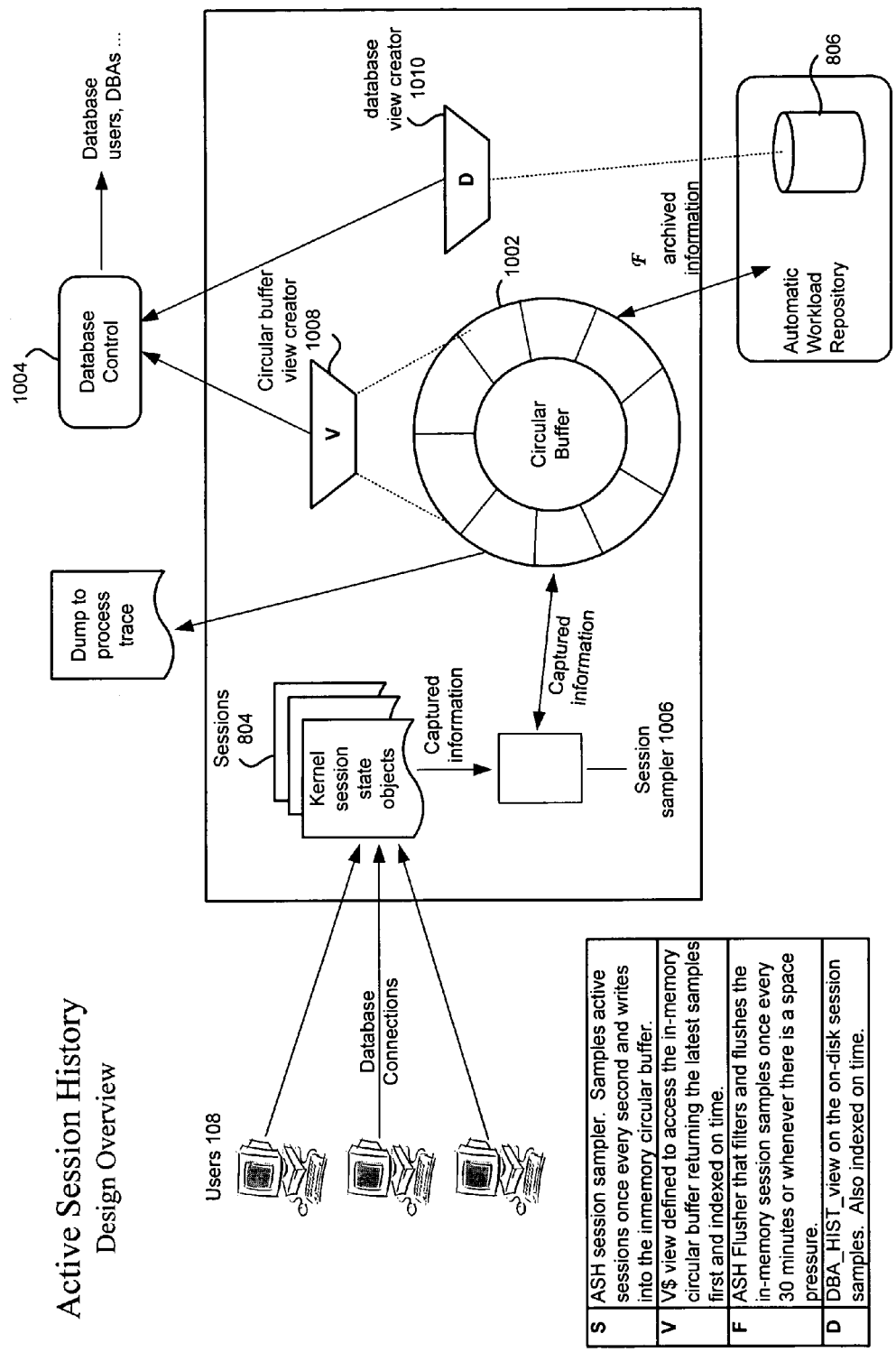
FIG. 10 depicts a more detailed block diagram of a system implementing an embodiment of the present invention.

FIG. 10 depicts a more detailed block diagram of a system 1000 implementing an embodiment of the present invention. System 1000 depicts the data flow for data captured by SAM 802. SAM 802 includes modules, such as session sampler 1006, circular buffer view creator 1008, and database view creator 1010, that may be implemented in software, hardware, or any combination thereof. Users 108 connect to database system 105. Sessions 804 are created and represented by state objects. The state objects include information about the activity for sessions 804.

Session sampler 1006 captures information from active sessions in sessions 804. The information is written to a circular buffer 1002. Circular buffer 1002 may temporarily store the captured information. It will be understood that a person of skill in the art will appreciate other storage devices in which information may be written.

Circular buffer 1002 is configured where recent information may be more easily accessible than older information. The recent information may be more likely to be accessed and may be accessed faster than information in database 806. As information for active sessions is captured periodically, it is written to an entry in circular buffer 1002. The information may be written where the oldest information may be flushed from circular buffer 1002. The oldest information in an entry may be deleted or archived to database 806. The filtering process will be discussed in more detail below. In another embodiment, the information in circular buffer 1002 may be flushed periodically (e.g., every 30 seconds) or when there is space pressure (e.g., buffer 1002 is reaching capacity). In this case, entries are not overwritten, rather information is flushed before any entry needs to be overwritten.

A database control 1004 is an interface that may be used to access captured information. In one embodiment, circular buffer view creator 1008 may create a view "V" using information in circular buffer 1002. Also, database view creator may create a view "D" from information from database 806. The information from view "V" and view "D" may be combined to form a complete view. The complete view may then be used to diagnose performance problems or used for other reasons. The views may be created by time, user 108 or session 804.

In one embodiment, the captured information is retrieved from circular buffer 1002 and database 806 by references one or more times. For example, captured information may be stored and indexed by time. Information may then be retrieved for a certain time period. Also, information may be further indexed by user 108 (e.g., which user is associated with a session 804 for which information is stored), by operation performed, etc.

Figure 11:
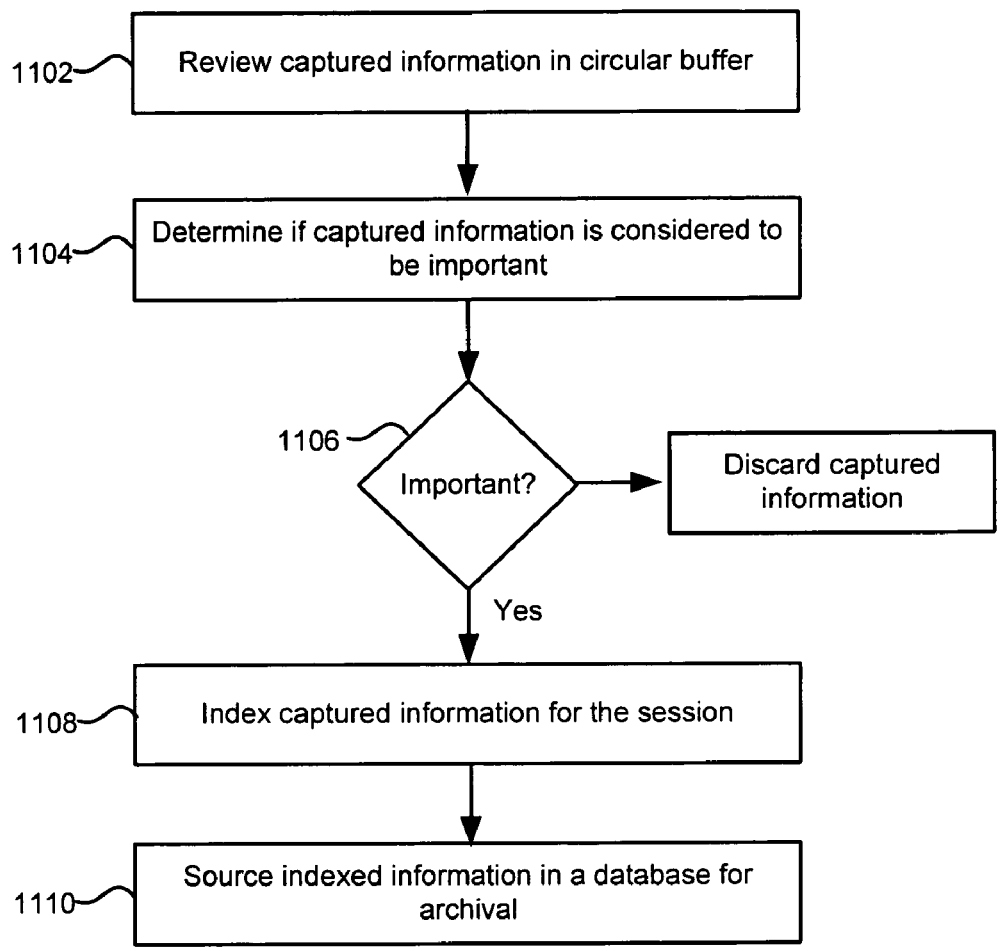
FIG. 11 depicts a simplified flow chart of a method for filtering captured information according to one embodiment of the present invention.

FIG. 11 depicts a simplified flow chart 1100 of a method for filtering captured information according to one embodiment of the present invention. In step 1102, captured information in circular buffer 1002 is reviewed. In one embodiment, the information is filtered on a user by user basis. For example, the information captured is associated with a session 804 and thus a user 108. The information for each session 804 is analyzed to determine if it should be deleted or stored. In another embodiment, the information captured for all active sessions is analyzed as a whole.

In step 1104, it is determined if the information selected in step 1102 is considered important. In one embodiment, different criteria are used to determine if the information is important and should be saved in database 806.

In another embodiment, time based filtering may be used. For example, the captured information at certain times is saved, such as one out of every three snapshots of information in circular buffer 1002 is saved.

In step 1106, if the captured information is not important, then is step 1108, the information is discarded. If the captured information is important, the information is indexed instep 1108.

In one embodiment, the information is indexed based on the time the information was captured. Thus, if any performance problems are detected, information may be retrieved when the problem occurred. The information may also be indexed by user 108 or session 804. For example, the index may be a user ID for information that was captured about a request a user 108 made. Also, the session 804 that was created for a user 108 may be used as an index. Information specific to users 108 and sessions 804 may then be retrieved. User and session-specific problems may then be diagnosed using this information.

In step 1110, the indexed information is stored in database 806. The information may be archived for retrieval at a later time. In one embodiment, one difference between information in circular buffer 1002 and database 806 is information in circular buffer 1002 may be accessed faster.

In one embodiment, information for a session 804 may not be available at a time information is captured. For example, an operation may be in progress for session 804 and still need to finish. A practical example is a surveillance camera taking pictures of a customer in a store. The camera may take a picture of a customer browsing products but that picture does not have the information that may be needed (e.g., whether the product was purchased). In this case, SAM 802 remembers which sessions 804 need information. Once the activity is finished, the previously stored captured information is updated with the new information. Accordingly, the prior snapshot of information includes the in progress activity and the final activity.

Accordingly, a sample of information is looking to a future event that may occur. Information when the event occurs or time that it took to complete is then captured when the event happens. A sample is then completed with the information. This is important because taking snapshots for a sample of database activity means that samples are in progress a lot. Thus, having a mechanism to determine what information is needed to add to a sample is important. The information about the completed operation or the time it took to complete is used in certain analysis of performance problems. In one embodiment, external queries, such as from users 108, cannot perform a data fixup if they are querying database system 105 for information.

Embodiments of the present invention provide many advantages. For example, the capturing of information at certain intervals decreases the times information is captured but increases the amount of information that can be captured. Because information is captured less frequently than for a full trace, information for all active sessions may be captured. The complete information for all active sessions that is captured at each time interval may be used to better diagnose performance problems.

The capturing of information at certain time intervals is more efficient in terms of CPU efficiency, impact on other database processes, and the total time taken to capture information for session activity. Also, the information is captured without using SQL queries thereby reducing database activity. Because information is captured at a database level without querying the database, information that cannot be captured outside the database (i.e., by users or applications querying the database) may be captured.

By having different granularities of snapshots in memory and secondary storage, analysis may be quickly done with more recent data and a more in-depth analysis done with information in the secondary storage.

Although embodiments of the present invention were described with reference to a database system 105, it will be understood that the embodiments are not limited to databases. For example, embodiments may be used in communications systems that are performing operations, Internet applications servers, etc. In one embodiment, any system that includes sessions may use embodiments of the present invention.

FIG. 12 is a block diagram of a system 1200 for implementing an embodiment of the invention. System 1200 includes user computers 1205, 12 10, and 1220. User computers 1205, 121 0, and 1220 can be general purpose personal computers having web browser applications. Alternatively, user computers 1205, 12 10, and 1220 can be any other electronic device, such as a thin-client computer, Internet-enabled mobile telephone, or personal digital assistant, capable of displaying and navigating web pages or other types of electronic documents. Although system 1200 is shown with three user computers, any number of user computers can be supported.

A web server 1225 is used to process requests for web pages or other electronic documents from user computers 1205, 1210, and 1220. In an embodiment of the invention, the data analysis software operates within a web browser on a user computer. In this embodiment, all user interaction with the data analysis software is via web pages sent to user computers via the web server 1225.

Web application server 1230 operates the data analysis software. In an embodiment, the web application server 1230 is one or more general purpose computers capable of executing programs or scripts in response to the user computers 1205, 1210 and 1215. The web application can be implemented as one or more scripts or programs written in any programming language, such as Java™, C, or C++, or any scripting language, such as Perl, Python, or TCL.

In an embodiment, the web application server 1230 dynamically creates web pages for displaying the data analysis software. The web pages created by the web application server 1230 are forwarded to the user computers via web server 1225. Similarly, web server 1225 receives web page requests and input data from the user computers 1205, 1210 and 1220, and forwards the web page requests and input data to web application server 1230.

The data analysis application on web application server 1230 processes input data and user computer requests and can be stored or retrieved data from database 1235. Database 1235 stores data created and used by the enterprise. In an embodiment, the database 1235 is a relational database, such as Oracle 9i, that is adapted to store, update, and retrieve data in response to SQL format commands.

An electronic communication network 1220 enables communication between computers 1205, 1210, and 1215, web server 1225, web application server 1230, and database 1235. In an embodiment, network 1220 may further include any form of electrical or optical communication devices, including wireless and wired networks. Network 1230 may also incorporate one or more local-area networks, such as an Ethernet network; wide-area networks, such as the Internet; and virtual networks, such as a virtual private network.

The system 1200 is one example for executing data analysis software according to an embodiment of the invention. In another embodiment, web application server 1230, web server 1225, and optionally database 1235 can be combined into a single server computer system. In alternate embodiment, all or a portion of the web application functions may be integrated into an application running on each of the user computers. For example, a Java™ or JavaScript™ application on the user computer is used to retrieve or analyze data and display portions of the data analysis application.

While the present invention has been described using a particular combination of hardware and software implemented in the form of control logic, it should be recognized that other combinations of hardware and software are also within the scope of the present invention. The present invention may be implemented only in hardware, or only in software, or using combinations thereof.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

Appendix A

Problems Detected and Reported by ADDM 104
  CPU bottlenecks due to Oracle as well as non-Oracle workloads.
  Top SQL statements along with top objects by the following criteria (when applicable)
  CPU
  elapsed
  IO bandwidth
  IO latency
  interconnect traffic in RAC
  Top statements by PLSQL and JAVA execution time.
  Excessive connection management (login/logoff).
  Hard Parse contention due to
  Shared pool undersizing
  Literals
  Invalidations
  Bind size mismatch
  Failed parses Excessive soft parsing Hot sequences leading to contention.

Excessive wait times caused by user locks (via the dbms_lock pkg)

Excessive wait times caused by DML locks (e.g.: lock table)

Excessive wait times caused by pipe put operations (e.g.: dbms_pipe.put)

Excessive wait times caused by concurrent updates to the same row (row lock waits)

Excessive wait times due to inadequate ITLs (large number of concurrent transactions updating a single block).

Excessive commits and rollbacks in the system leading to high overhead on a per transaction basis (logfile sync).

I/O capacity issues due to limited bandwidth and latency and potential causes (like excessive checkpointing due to logfile size and MTTR, excessive undo, etc.)

Inadequate I/O throughput for db block writes by DBWR.

System slowdown due to inability of archiver processes to keep up with redo generation.

Log buffer contention and sizing issues

Undersized redo logfile issues

Contention due to extent allocation

Contention due to moving the high watermark of an object

Undersized memory issues

SGA

PGA

Buffer Cache

Shared Pool

Hot block (with block details) with high read/write contention within an instance and across the cluster.

Hot object with high read/write contention within an instance and across the cluster.

Buffer cache latch contention due to access patterns.

Cluster interconnect latency issues in a RAC environment.

Inability of LMS processes to keep up in a RAC environment leading to congestion for lock requests.

What is claimed is:

1. A method for quantifying an impact of wasteful operations in a database, the method comprising:

receiving one or more operations that are determined to be wasteful when performed in the database;

detecting when one or more wasteful operations are being performed in the database;

recording a time value that is spent on a wasteful operation; and generating information that quantifies the impact of a performance problem in the database based on the time value; storing the time value, wherein the time value is used to quantify the impact of a performance problem in the database;

wherein the time value measures time spent processing the wasteful operation in the database;

generating an accumulated time value associated with the wasteful operation based on the time value; and wherein generating the accumulated time value associated with the wasteful operation comprises adding the time value to another time value associated with another operation, the another operation being a database operation that includes the wasteful operation and at least one or more other wasteful operations.

2. The method of claim 1, further comprising:

generating information indicative of the impact of the wasteful operation on the database based on the time value.

3. The method of claim 1, further comprising:

generating a mapping associating the time value with the wasteful operation.

4. The method of claim 1, further comprising analyzing the performance problem using the time value.

5. A method for quantifying wasteful operations in a database, the method comprising:

receiving a plurality of operations that are determined to be wasteful when performed in the database;

detecting when wasteful operations are being performed in the database;

recording a plurality of time values for time spent on performing each of the wasteful operations; and storing the plurality of time values, wherein a time value is associated with a wasteful operation for which the time value was recorded, wherein the time values are used to quantify a performance problem in the database;

wherein the time value measures time spent processing the wasteful operation in the database;

generating an accumulated time value associated with the wasteful operation based on the time value; and wherein generating the accumulated time value associated with the wasteful operation comprises adding the time value to another time value associated with another operation, the another operation being a database operation that includes the wasteful operation and at least one or more other wasteful operations.

6. The method of claim 5, wherein the impact of the wasteful operation is known before a performance problem quantified by the time value associated with the wasteful operation is fixed.

7. The method of claim 5, further comprising:

generating information quantifying the impact of one or more performance problems in the database based on the plurality of time values for the wasteful operations.

8. The method of claim 7, wherein each time value in the plurality of time values measures the amount of time an associated wasteful operation is processed in the database.

9. The method of claim 5, further comprising determining one or more rules that are used to determine when a wasteful operation is being performed.

10. A method for quantifying an impact of wasteful operations in a database, the method comprising:

determining one or more operations that are determined to be wasteful when performed in the database;

determining when to monitor the one or more operations, wherein the one or more operations are monitored when the one or more operations are being processed in the database;

detecting when one or more wasteful operations are being performed in the database;

quantifying an impact of a wasteful operation; and storing information indicative of a value that quantifies the impact of the wasteful operation for a performance problem in the database;

wherein the value measures time spent processing the wasteful operation in the database;

generating an accumulated value associated with the wasteful operation based on the time value; and wherein generating the accumulated value associated with the wasteful operation comprises adding the value to another value associated with another operation, the another operation being a database operation that includes the wasteful operation and at least one or more other wasteful operations.

11. A computer program product having a computer-readable medium storing a set of code module which when executed by a processor of a computer system cause the processor to quantify an impact of wasteful operations in a database, the computer program product comprising:

code for receiving one or more operations that are determined to be wasteful when performed in the database;

code for detecting when one or more wasteful operations are being performed in the database;

code for recording a time value that is spent on a wasteful operation; and code for generating information that quantifies the impact of a performance problem in the database based on the time value; storing the time value, wherein the time value is used to quantify the impact of a performance problem in the database;

wherein the time value measures time spent processing the wasteful operation in the database;

code for generating an accumulated time value associated with the wasteful operation based on the time value; and wherein generating the accumulated time value associated with the wasteful operation comprises adding the time value to another time value associated with another operation, the another operation being a database operation that includes the wasteful operation and at least one or more other wasteful operations.

12. The computer program product of claim 11, wherein the time value measures time spent processing the wasteful operation in the database.

13. The computer program product of claim 11, further comprising:

code for generating information indicative of the impact of the wasteful operation on the database based on the time value.

14. The computer program product of claim 11, further comprising code for analyzing the performance problem using the time value.

15. A computer program product having a computer-readable medium storing a set of code modules which when executed by a processor of a computer system cause the processor to quantify wasteful operations in a database, the computer program product comprising:

code for receiving a plurality of operations that are determined to be wasteful when performed in the database;

code for detecting when wasteful operations are being performed in the database;

code for recording a plurality of time values for time spent on performing each of the wasteful operations; and code for storing the plurality of time values, wherein a time value is associated with a wasteful operation for which the time value was recorded, wherein the time values are used to quantify a performance problem in the database;

wherein the time value measures time spent processing the wasteful operation in the database;

code for generating an accumulated time value associated with the wasteful operation based on the time value; and wherein generating the accumulated time value associated with the wasteful operation comprises adding the time value to another time value associated with another operation, the another operation being a database operation that includes the wasteful operation and at least one or more other wasteful operations.

16. The computer program product of claim 15, wherein the impact of the wasteful operation is known before a performance problem quantified by the time value associated with the wasteful operation is fixed.

17. The computer program product of claim 15, further comprising:

generating information quantifying the impact of one or more performance problems in the database based on the plurality of time values for the wasteful operations.

18. The computer program product of claim 17, wherein each time value associated with a wasteful operation measures the amount of time the wasteful operation is processed in the database.

* * * * *